(12) United States Patent
Frey et al.

(10) Patent No.: US 8,140,759 B2
(45) Date of Patent: *Mar. 20, 2012

(54) SPECIFYING AN ACCESS HINT FOR PREFETCHING PARTIAL CACHE BLOCK DATA IN A CACHE HIERARCHY

(75) Inventors: Bradly George Frey, Austin, TX (US); Guy Lynn Guthrie, Austin, TX (US); Cathy May, Ossining, NY (US); Ramakrishnan Rajamony, Austin, TX (US); Balaram Sinharoy, Poughkeepsie, NY (US); William John Starke, Round Rock, TX (US); Peter Kenneth Szwed, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 441 days.

This patent is subject to a terminal disclaimer.

(21) Appl. No.: 12/424,716

(22) Filed: Apr. 16, 2009

(65) Prior Publication Data

US 2010/0268886 A1    Oct. 21, 2010

(51) Int. Cl.
*G06F 13/00* (2006.01)

(52) U.S. Cl. .................................... 711/122; 711/141
(58) Field of Classification Search .................. 711/122, 711/141, E12.023, E12.024
See application file for complete search history.

(56) References Cited

U.S. PATENT DOCUMENTS

| | | | |
|---|---|---|---|
| 4,694,395 A | 9/1987 | Young et al. | |
| 5,210,842 A | 5/1993 | Sood | |
| 5,276,850 A | 1/1994 | Sakaue | |
| 5,418,916 A | 5/1995 | Hall et al. | |
| 5,555,391 A | 9/1996 | De Subijana et al. | |
| 5,778,438 A | 7/1998 | Merchant | |
| 5,802,572 A | 9/1998 | Patel et al. | |
| 5,893,147 A | 4/1999 | Deng | |
| 5,893,151 A | 4/1999 | Merchant | |
| 5,926,829 A | 7/1999 | Hagersten et al. | |
| 6,058,456 A | 5/2000 | Arimilli et al. | |
| 6,122,729 A | 9/2000 | Tran | |
| 6,131,145 A | 10/2000 | Matsubara et al. | |
| 6,195,735 B1 | 2/2001 | Krueger et al. | |
| 6,199,107 B1 | 3/2001 | Dujari | |
| 6,216,219 B1 | 4/2001 | Cai et al. | |
| 6,321,306 B1 | 11/2001 | Arimilli et al. | |
| 6,345,341 B1 | 2/2002 | Arimilli et al. | |

(Continued)

OTHER PUBLICATIONS

L.B. Arimilli—Office Action dated Jan. 12, 2011; U.S. Appl. No. 12/024,392.

(Continued)

*Primary Examiner* — Vu Le
(74) *Attorney, Agent, or Firm* — Yudell Isidore Ng Russell PLLC

(57) ABSTRACT

A system and method for specifying an access hint for prefetching only a subsection of cache block data, for more efficient system interconnect usage by the processor core. A processing unit receives a data cache block touch (DCBT) instruction containing an access hint and identifying a specific size portion of data to be prefetched. Both the access hint and a value corresponding to an amount of data to be prefetched are contained in separate subfields of the DCBT instruction. In response to detecting that the code point is set to a specific value, only the specific size of data identified in a sub-field of the DCBT and addressed in the DCBT instruction is prefetched into an entry in the lower level cache.

20 Claims, 4 Drawing Sheets

U.S. PATENT DOCUMENTS

| | | | |
|---|---|---|---|
| 6,345,342 B1 | 2/2002 | Arimilli et al. | |
| 6,353,877 B1 | 3/2002 | Duncan et al. | |
| 6,356,980 B1 | 3/2002 | Arimilli et al. | |
| 6,360,297 B1 | 3/2002 | Arimilli et al. | |
| 6,446,167 B1 | 9/2002 | Mayfield et al. | |
| 6,460,115 B1 | 10/2002 | Kahle et al. | |
| 6,470,427 B1 | 10/2002 | Arimilli et al. | |
| 6,499,085 B2 | 12/2002 | Bogin et al. | |
| 6,557,080 B1 | 4/2003 | Burger et al. | |
| 6,564,302 B1 | 5/2003 | Yagi et al. | |
| 6,571,319 B2 | 5/2003 | Tremblay et al. | |
| 6,571,322 B2 | 5/2003 | Arimilli et al. | |
| 6,615,321 B2 | 9/2003 | Arimilli et al. | |
| 6,643,744 B1 | 11/2003 | Cheng | |
| 6,647,466 B2 | 11/2003 | Steely, Jr. | |
| 6,681,296 B2 | 1/2004 | Liao et al. | |
| 6,704,860 B1 | 3/2004 | Moore | |
| 6,763,433 B1 | 7/2004 | Arimilli et al. | |
| 6,763,434 B2 | 7/2004 | Arimilli et al. | |
| 6,772,288 B1 | 8/2004 | Flake et al. | |
| 6,785,772 B2 * | 8/2004 | Venkumahanti et al. | 711/137 |
| 6,823,447 B2 | 11/2004 | Hay et al. | |
| 6,848,071 B2 | 1/2005 | Chaudhry et al. | |
| 6,957,305 B2 | 10/2005 | Ray et al. | |
| 6,971,000 B1 | 11/2005 | Sinharoy et al. | |
| 6,978,351 B2 | 12/2005 | Osbourne et al. | |
| 7,028,159 B2 | 4/2006 | Matsubara et al. | |
| 7,062,609 B1 | 6/2006 | Trehus et al. | |
| 7,065,548 B2 | 6/2006 | Van Oldenborgh et al. | |
| 7,234,040 B2 | 6/2007 | Berg et al. | |
| 7,237,068 B2 | 6/2007 | Wallin et al. | |
| 7,350,032 B2 | 3/2008 | Stenstrom | |
| 7,380,047 B2 | 5/2008 | Emma et al. | |
| 7,533,242 B1 | 5/2009 | Moll et al. | |
| 7,600,143 B1 | 10/2009 | Neuman | |
| 7,958,309 B2 | 6/2011 | Arimilli et al. | |
| 2002/0087801 A1 | 7/2002 | Bogin et al. | |
| 2002/0087809 A1 | 7/2002 | Arimilli et al. | |
| 2002/0092029 A1 | 7/2002 | Smith | |
| 2002/0112124 A1 | 8/2002 | Arimilli et al. | |
| 2002/0133674 A1 | 9/2002 | Martin et al. | |
| 2002/0138698 A1 | 9/2002 | Kalla | |
| 2002/0174253 A1 | 11/2002 | Hayter et al. | |
| 2003/0046356 A1 | 3/2003 | Alvarex et al. | |
| 2003/0084250 A1 | 5/2003 | Gaither et al. | |
| 2003/0110117 A1 | 6/2003 | Saidenberg et al. | |
| 2003/0159005 A1 | 8/2003 | Augsburg et al. | |
| 2003/0177320 A1 | 9/2003 | Sah et al. | |
| 2003/0208665 A1 | 11/2003 | Pier et al. | |
| 2004/0037276 A1 | 2/2004 | Henderson et al. | |
| 2004/0039879 A1 | 2/2004 | Gaither | |
| 2004/0049615 A1 | 3/2004 | Liang | |
| 2004/0117510 A1 | 6/2004 | Arimilli et al. | |
| 2004/0205298 A1 | 10/2004 | Bearden et al. | |
| 2004/0260879 A1 | 12/2004 | Barroso et al. | |
| 2004/0268051 A1 | 12/2004 | Berg et al. | |
| 2005/0027911 A1 | 2/2005 | Hayter et al. | |
| 2005/0053057 A1 | 3/2005 | Deneroff et al. | |
| 2005/0080994 A1 | 4/2005 | Cohen et al. | |
| 2005/0204113 A1 | 9/2005 | Harper et al. | |
| 2005/0210203 A1 | 9/2005 | Stenstrom | |
| 2005/0240729 A1 | 10/2005 | Van Berkel et al. | |
| 2005/0240736 A1 | 10/2005 | Shaw | |
| 2006/0080511 A1 | 4/2006 | Hoover et al. | |
| 2006/0085600 A1 | 4/2006 | Miyashita et al. | |
| 2006/0173851 A1 | 8/2006 | Singh et al. | |
| 2006/0174228 A1 | 8/2006 | Radhakrishnan et al. | |
| 2006/0179239 A1 | 8/2006 | Fluhr et al. | |
| 2006/0179254 A1 | 8/2006 | Clark et al. | |
| 2006/0184607 A1 | 8/2006 | Le Leannec et al. | |
| 2006/0184746 A1 | 8/2006 | Guthrie et al. | |
| 2006/0184772 A1 | 8/2006 | Dooley et al. | |
| 2006/0212648 A1 | 9/2006 | Cox et al. | |
| 2006/0251092 A1 | 11/2006 | Matterne et al. | |
| 2006/0259707 A1 | 11/2006 | Freytag | |
| 2006/0265552 A1 | 11/2006 | David et al. | |
| 2007/0038846 A1 | 2/2007 | Kadambi et al. | |
| 2007/0050592 A1 | 3/2007 | Gschwind et al. | |
| 2007/0058531 A1 | 3/2007 | Dierks et al. | |
| 2007/0079073 A1 | 4/2007 | Rosenbluth et al. | |
| 2007/0083716 A1 | 4/2007 | Rajamony et al. | |
| 2007/0088919 A1 * | 4/2007 | Shen et al. | 711/154 |
| 2007/0094450 A1 | 4/2007 | Vanderwiel | |
| 2007/0136374 A1 | 6/2007 | Guedalia | |
| 2007/0168619 A1 | 7/2007 | Hutton et al. | |
| 2007/0214335 A1 | 9/2007 | Bellows et al. | |
| 2007/0220208 A1 | 9/2007 | Nomura et al. | |
| 2007/0294264 A1 | 12/2007 | Bayardo, Jr. et al. | |
| 2008/0056051 A1 | 3/2008 | Mayer et al. | |
| 2008/0086602 A1 | 4/2008 | Guthrie et al. | |
| 2008/0104330 A1 | 5/2008 | Deshpanda | |
| 2008/0183972 A1 | 7/2008 | Dieffenderfer | |
| 2008/0244185 A1 | 10/2008 | O'Krafka et al. | |
| 2008/0256303 A1 | 10/2008 | Croxford et al. | |
| 2009/0198865 A1 | 8/2009 | Arimilli et al. | |
| 2009/0198912 A1 | 8/2009 | Arimilli et al. | |
| 2009/0198914 A1 | 8/2009 | Arimilli et al. | |
| 2009/0198960 A1 | 8/2009 | Arimilli et al. | |

OTHER PUBLICATIONS

L.B. Arimilli—Office Action dated Jan. 10, 2011; U.S. Appl. No. 12/024,432.

Ravi K. Arimilli—Office Action dated Jan. 20, 2011; U.S. Appl. No. 12/024,174.

L.B. Arimilli—Office Action dated Feb. 7, 2011; U.S. Appl. No. 12/024,467.

Sheu et al.; "The Selection of Optimal Cache Lines for Microprocessor Based Controllers"; Proceedings of the 23rd Annual Workshop and Symposium on Microprogramming and Micro-Architecture MICRO Nov. 23, 1990.

Milenkovic et al.; "Compiler and Runtime Hints for Memory Management"; IBM TDB n8b, pp. 76-77, Jan. 1990.

Song; "Methods of Specifying Data Pre-Fetching Without Using a Separate Instruction"; IBM TDB vol. 38, No. 6, pp. 355-356, Jun. 1995.

Hazim; "System and Method to Improve Hardware Pre-Fetching Using Translation Hints"; DOSS# AUS920040822, Oct. 2004.

Wang; "Cooperative Hardware/Software Caching for Next Generation Memory Systems"; vol. 6501B of Dissertations Abstracts International, 2004.

Funk et al.; "Instruction Cache Block Retro-Fitted onto Microprocessor"; IBM TDB vol. 28, No. 7, pp. 53-56, Jul. 1995.

Van Peursem; "A New Hardware Pre-Fetching Scheme Based on Dynamic Interpretation of the Instruction Stream Cache"; vol. 5509B of Dissertations Abstracts International, 1994.

Duncan et al.; High Performance I/O Design in the Alphaserver 4100 Symmetric Multi-Processing System, Digital Technical Journal, vol. 8, No. 4, pp. 61-75, 1996.

Tian et al.; "A Unified Compressed Cache Hierarchy Using Simple Frequent pattern Compression and Partial Cache Line Pre-Fetching"; Embedded Software and Systems, Third International Conference, ICESS 2007, May 2007.

Hwang et al., Delayed Precise Invalidation a Software Cache Coherence Scheme, IEEE Proceeding Computer and Digital Techniques, vol. 143, No. 5, pp. 337-344, Sep. 1996.

Gilbert et al., Distributed Data Cache Designs for Clustered VLIW Processors, IEEE Transactions on Computers, vol. 54, No. 10, pp. 1227-1241, Oct. 2005.

U.S. Appl. No. 12/024,467, "Interconnect Operation Indicating Acceptability of Partial Data Delivery," Notice of Allowance dated Oct. 5, 2010.

U.S. Appl. No. 12/024,170, "Varying an Amount of Data Retrieved from Memory Based upon an Instruction Hint," Non-Final Office Action dated Dec. 22, 2010.

U.S. Appl. No. 12/024,170, "Varying an Amount of Data Retrieved from Memory Based upon an Instruction Hint," Final Office Action dated May 27, 2011.

U.S. Appl. No. 12/024,165, "Method and System for Sourcing Differing Amounts of Prefetch Data in Response to Data Prefetch Requests," Non-Final Office Action dated Nov. 16, 2010.

U.S. Appl. No. 12/024,165, "Method and System for Sourcing Differing Amounts of Prefetch Data in Response to Data Prefetch Requests," Final Office Action dated Apr. 27, 2011.

Guo et al.;"Cooperative Caching for Peer Assisted Video Distribution"; Advances in Multimedia Modeling, 13th International Multimedia Modeling Conference; MMM 2007; Lecture Notes in Computer Science; vol. 4351; pp. 135-144.

Emma et al.; "Partial Store Lines in Store in Caches"; IBM TDB; p. 4240; Dec. 1984.

J. Hoogerbrugge; "Cost Effiecient Branch Target Buffers" Euro-Par 2004 Parallel Processing; 10th International Euro-Par Conference; Lecture Notes in Computer Science; vol. 1900; pp. 950-959; Aug.-Sep. 2000.

Parmentier et al.; "Cache Based Parallelization of Multiple Sequence Alignment Problem"; Euro-Par Parallel Processing; 10th International Euro-Par Conference; Lecture Notes in Computer Science; vol. 3149; pp. 950-959.

U.S. Appl. No. 12/024,392, "Claiming Coherency Ownership of a Partial Cache Line of Data," Non-Final Office Action dated Jun. 13, 2011.

U.S. Appl. No. 12/024,424, "Data Processing System, Processor and Method that Perform a Partial Cache Line Storage-Modifying Operation Based upon a Hint," Non-Final Office Action dated Sep. 28, 2010.

U.S. Appl. No. 12/024,424, "Data Processing System, Processor and Method that Perform a Partial Cache Line Storage-Modifying Operation Based upon a Hint," Non-Final Office Action dated Aug. 12, 2011.

U.S. Appl. No. 12/024,447, "Data Processing System, Processor and Method for Implementing Cache Management for Partial Cache Line Operations," Non-Final Office Action dated Sep. 28, 2010.

U.S. Appl. No. 12/024,447, "Data Processing System, Processor and Method for Implementing Cache Management for Partial Cache Line Operations," Notice of Allowance dated Aug. 19, 2011.

U.S. Appl. No. 12/024,174, "Touch of a Partial Cache Line of Data," Final Office Action dated Jul. 1, 2011.

U.S. Appl. No. 12/024,467, "Interconnect Operation Indicating Acceptability of Partial Data Delivery," Non-Final Office Action dated Oct. 13, 2010.

U.S. Appl. No. 12/024,467, "Interconnect Operation Indicating Acceptability of Partial Data Delivery," Non-Final Office Action dated May 17, 2011.

U.S. Appl. No. 12/024,432, "Partial Cache Line Accesses Based on Memory Access Patterns," Non-Final Office Action dated Sep. 24, 2010.

U.S. Appl. No. 12/024,432, "Partial Cache Line Accesses Based on Memory Access Patterns," Notice of Allowance dated May 16, 2011.

US Patent No. 7958309, "Dynamic Selection of a Memory Access Size," Non-Final Office Action dated Oct. 20, 2010.

US Patent No. 7958309, "Dynamic Selection of a Memory Access Size," Notice of Allowance dated Jan. 31, 2011.

U.S. Appl. No. 12/424,434, "Updating Partial Cache Lines in a Data Processing System," Notice of Allowance dated Aug. 4, 2011.

* cited by examiner

SPECIFYING AN ACCESS HINT FOR PREFETCHING PARTIAL CACHE BLOCK DATA IN A CACHE HIERARCHY

This invention was made with United State Government support under Agreement No. HR0011-07-9-002, awarded by DARPA. THE GOVERNMENT HAS CERTAIN RIGHTS IN THE INVENTION.

CROSS-REFERENCE TO RELATED APPLICATION

The present application is related to U.S. patent application Ser. No. 12/424,681, which is filed concurrently herewith and incorporated herein by reference in its entirety.

BACKGROUND OF THE INVENTION

1. Technical Field

The present invention relates generally to data processing systems and specifically to prefetching data to a cache. Still more particularly, the present invention relates to an improved system and method of identifying and prefetching a cache block to a cache memory.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

In some systems, the cache hierarchy includes multiple levels, with each lower level generally having a successively longer access latency. Thus, a level one (L1) cache generally has a lower access latency than a level two (L2) cache, which in turn has a lower access latency than a level three (L3) cache.

The level one (L1) or upper-level cache is usually a private cache associated with a particular processor core in an MP system. Because of the low access latencies of L1 caches, a processor core first attempts to service memory access requests in its L1 cache. If the requested data is not present in the L1 cache or is not associated with a coherency state permitting the memory access request to be serviced without further communication, the processor core then transmits the memory access request to one or more lower-level caches (e.g., level two (L2) or level three (L3) caches) for the requested data.

Typically, when a congruence class of an upper-level cache becomes full, cache lines are removed ("evicted") and may be written to a lower-level cache or to system memory for storage. In some cases, a lower level cache (e.g., an L3 cache) is configured as a "victim" cache, which conventionally means that the lower level cache is entirely populated with cache lines evicted from one or more higher level caches in the cache hierarchy rather than by memory blocks retrieved by an associated processor. Data is typically managed in conventional victim caches using a least recently used (LRU) cast-out mechanism, as the structure is prefetched into the cache, the oldest data blocks of a target set are cast out. Eventually, all data that previously resided in the set is replaced by the prefetched data. Because the use of the data structure is temporally limited, casting out the oldest data is not the optimal choice, since the newest prefetched data is not used again in the near future. Furthermore, when an access pattern exhibits low spacial locality, much of the memory bus bandwidth required to prefetch an entire cache block is waste, as a portion of the data passed over the memory bus may never be used. When a systems performance is bus-bandwidth limited, the advantage of prefetching may be negated by the latency introduced by inefficient bus utilization.

SUMMARY OF THE INVENTION

Disclosed is a system and method for specifying an access hint for prefetching only a subsection of cache block data, for more efficient system interconnect usage by the processor core. A processing unit receives a data cache block touch (DCBT) instruction containing an access hint and identifying a specific size portion of data to be prefetched. Both the access hint and a value corresponding to an amount of data to be prefetched are contained in separate subfields of the DCBT instruction. In response to detecting that the code point is set to a specific value, only the specific size of data identified in a sub-field of the DCBT and addressed in the DCBT instruction is prefetched into an entry in the lower level cache.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
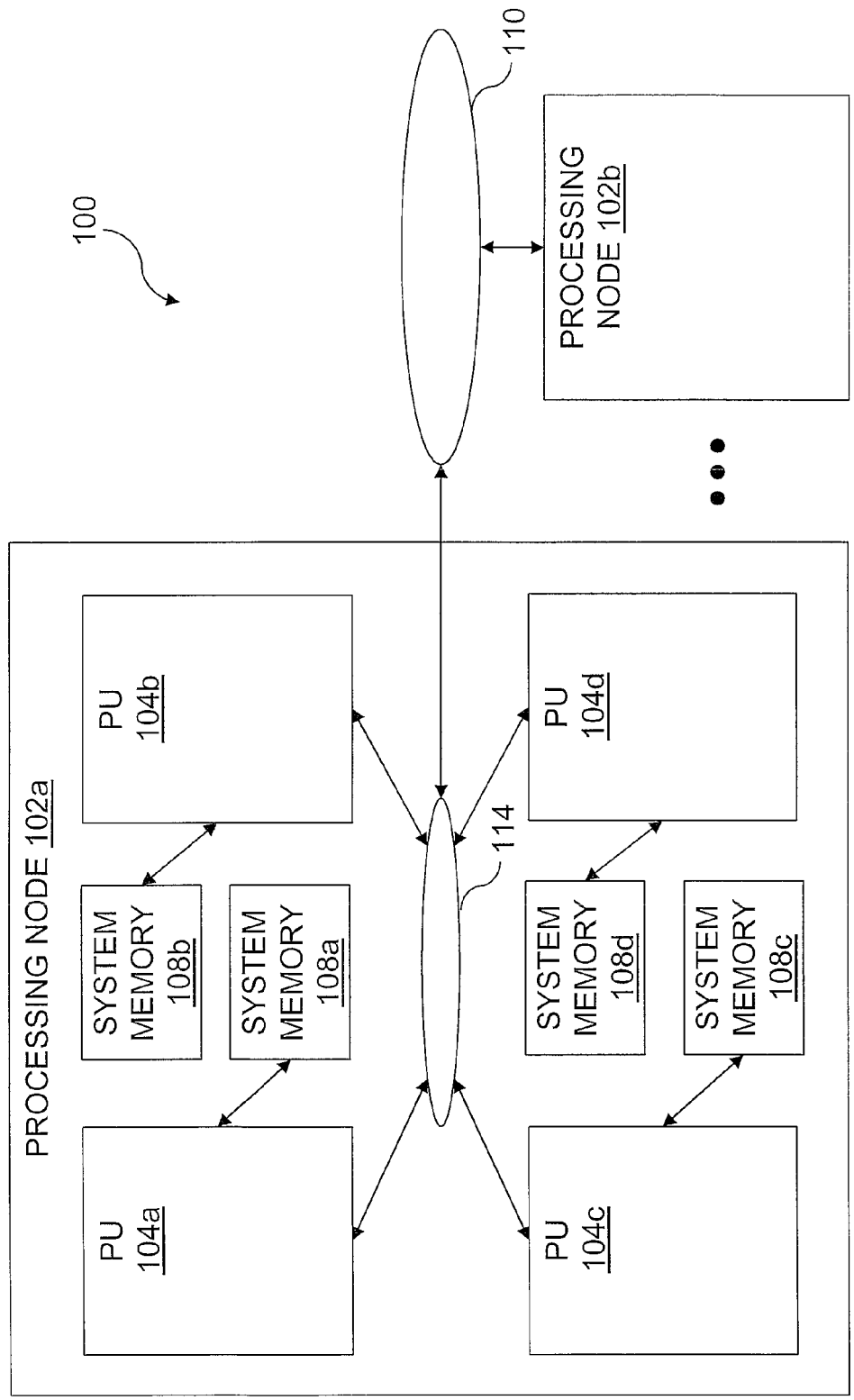
FIG. 1 is a high-level block diagram of an exemplary data processing system, in accordance with one embodiment of the present invention.

With reference now to the figures, wherein like reference numerals refer to like and corresponding parts throughout, and in particular with reference to FIG. 1, there is illustrated a high-level block diagram depicting an exemplary data processing system in which the present invention may be implemented. The data processing system is depicted as a cache coherent symmetric multiprocessor (SMP) data processing system 100. As shown, data processing system 100 includes multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches or as a hybrid interconnect.

As described below in greater detail with reference to FIG. 2A, processing units 104 each include a memory controller 106 coupled to local interconnect 114 to provide an interface to a respective system memory 108. Data and instructions residing in system memories 108 can generally be accessed and modified by a processor core in any processing unit 104 of any processing node 102 within data processing system 100. In alternative embodiments of the invention, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2A:
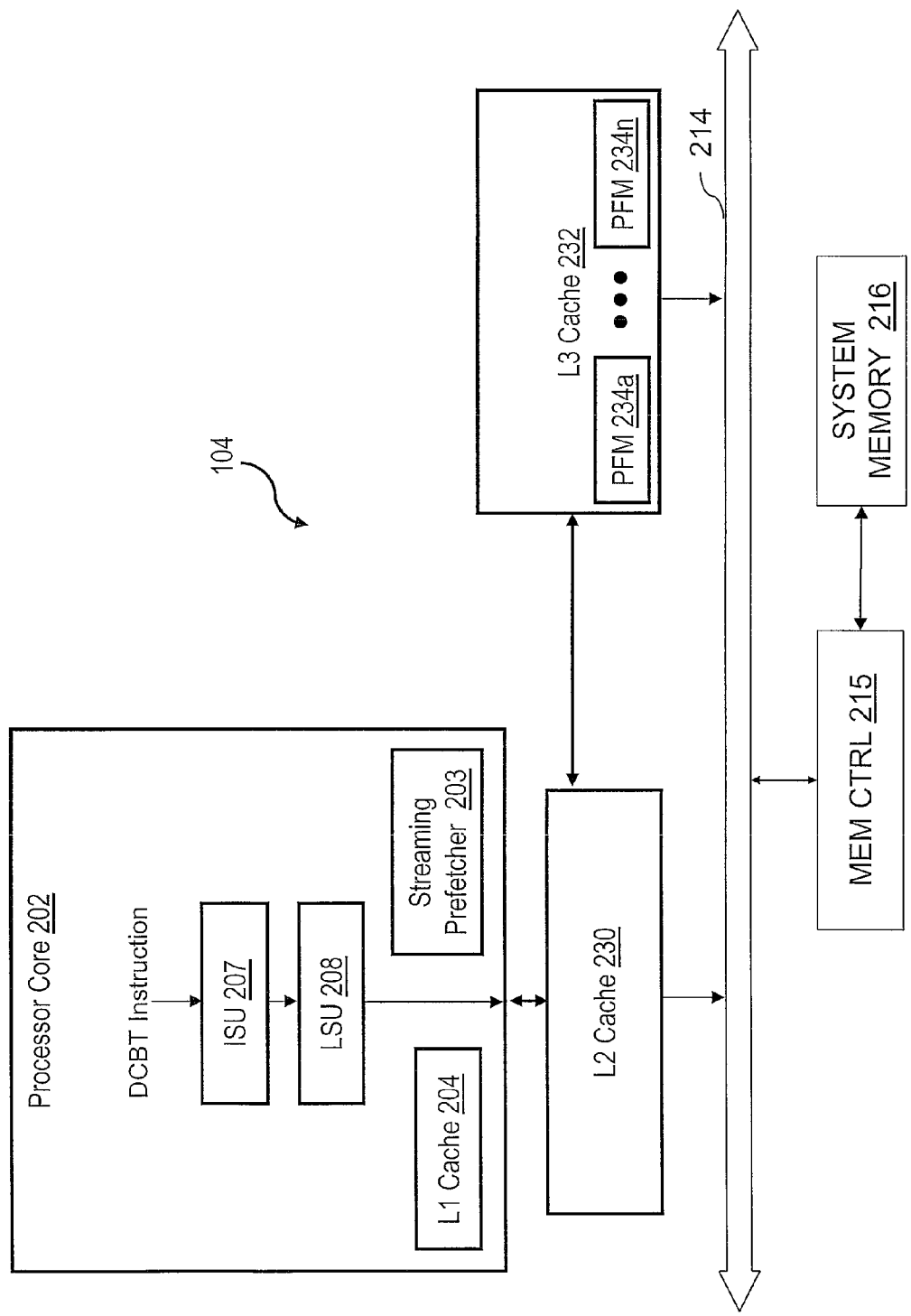
FIG. 2A is a more detailed block diagram of an exemplary embodiment of a processor core and associated cache hierarchy of a processing unit, in accordance with one embodiment of the present invention.

With reference now to FIG. 2A is a more detailed block diagram of an exemplary embodiment of a processor core 202 and associated cache hierarchy of a processing unit 104a-n from FIG. 1. Processor core 202 includes circuitry for processing instructions and data. In the course of such processing, the circuitry of processor core 202 generates various memory access requests, such as load and store requests.

The operation of processor core 202 is supported by a cache memory hierarchy including a store-through level one (L1) cache 204 within each processor core 202, a store-in level two (L2) cache 230, and a lookaside L3 cache 232 that is utilized as a victim cache for L2 cache 230 and accordingly is filled by cache lines evicted from L2 cache 230. Processing unit 104 further includes an integrated I/O (input/output) controller 214 supporting the attachment of one or more I/O devices (not depicted) and is supported by a shared system memory 218 accessed via an integrated memory controller 215. In contrast to many conventional victim cache arrangements, the contents of L3 cache 232 are not exclusive of the contents of L2 cache 230, meaning that a given memory block may be held concurrently in L2 cache 230 and L3 cache 232.

Each processor core 202 includes at least an instruction sequencing unit (ISU) 207 for prefetching and demand fetching instructions, including data cache block touch (DCBT) instructions, and for ordering instructions for execution. A further description of the implementation of DCBT instructions is described in detail in U.S. Pat. No. 6,957,305, which is incorporated herein by reference.

Processor core 202 may also include a load-store unit (LSU) 208 for executing memory access instructions that references a memory block or cause the generation of an operation referencing a memory block. In at least some embodiments, each processor core 202 is capable of simultaneously executing instructions within two or more hardware threads of execution.

In at least some embodiments, processor core 202 further includes a streaming prefetcher 203 that generates and transmits to the memory hierarchy prefetch requests requesting data to be staged into its cache memory hierarchy in advance of need (e.g., prior to a demand load or store). In preferred embodiments, streaming prefetcher 203 supports multiple concurrent prefetching streams, and in at least some cases, supports multiple concurrent prefetching stream types having differing behaviors. For example, in one exemplary embodiment, streaming prefetcher 203 includes a load prefetch stream to prefetch memory blocks that may be the target of load requests, a store prefetch stream to prefetch memory blocks that may be targets of store requests, and a load/store prefetch stream to prefetch memory blocks that may be target of load and/or store requests. These different prefetch streams may have different associated strides, stream depths, caching rules, etc., as discussed further below. In other embodiments, processor core 202 may implement prefetching without streaming, that is, without fetching from a sequence of addresses linked by a common stride.

In order to support prefetching while limiting the associated cost and latency impact on the cache memory hierarchy, L3 cache 232 includes at least one and preferably many prefetch machines (PFMs) 234a-234n that, in response to prefetch requests issued by streaming prefetcher 203 that miss in the cache memory hierarchy, manage the transmission of the prefetch requests to the system for service and the installation of prefetch data in the cache memory hierarchy.

Although the illustrated cache hierarchy includes only three levels of cache, those skilled in the art will appreciate that alternative embodiments may include additional levels (L4, L5, etc.) of on-chip or off-chip in-line or lookaside cache, which may be fully inclusive, partially inclusive, or non-inclusive of the contents the upper levels of cache. Further, any of the various levels of the cache hierarchy may be private to a particular processor core 202 or shared by multiple processor cores 202. For example, in some implementations, the cache hierarchy includes an L2 cache 230 for each processor core 202, with multiple of the L2 caches 230 sharing a common L3 cache 232.

Figure 2B:
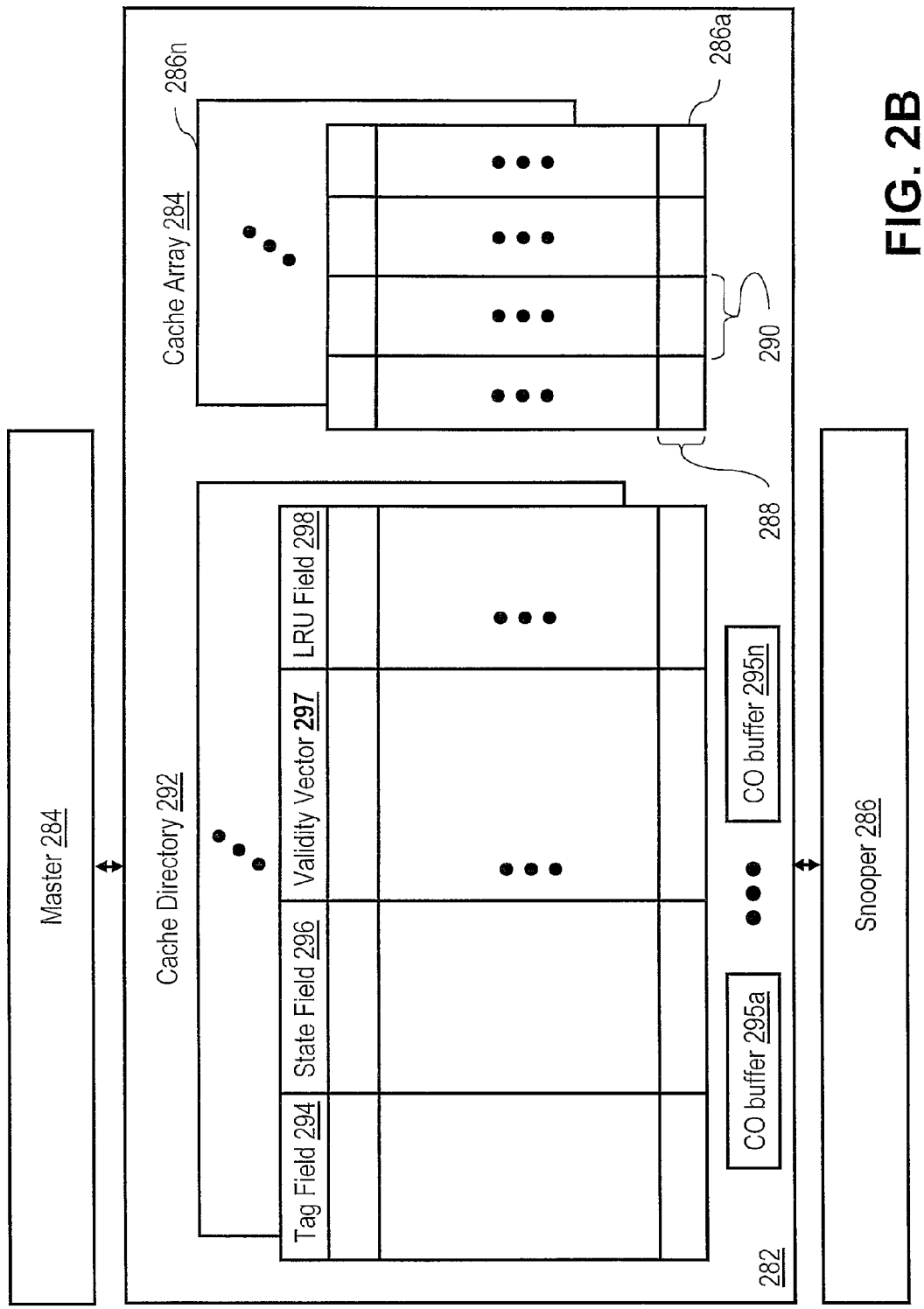
FIG. 2B is a more detailed block diagram of the cache memory that may be utilized to implement L2 cache or L3 cache from FIG. 2A, in accordance with one embodiment of the present invention.

Referring now to FIG. 2B, there is depicted an exemplary embodiment of a cache memory 280 that may be utilized to implement L2 cache 230 or L3 cache 232 from FIG. 2A. As shown, cache memory 280 includes an array and directory 282, as well as a cache controller comprising a master 284 and a snooper 286. Snooper 286 snoops operations from local interconnect 114, provides appropriate responses, and performs any accesses to array and directory 282 required by the operations. Master 284 initiates transactions on local interconnect 114 and system interconnect 110 and accesses array and directory 282 in response to memory access (and other) requests originating within the processor core and cache hierarchy 200. In at least some embodiments, master 284 also handles casting out data to lower levels of the memory hierarchy (e.g., L3 victim cache 232 or system memory 108).

Array and directory 282 includes a set associative cache array 284 including multiple ways 286a-286n. Each way 286 includes multiple entries 288, which in the depicted embodiment each provide temporary storage for up to a full memory block of data, e.g., 128 bytes. Each cache line or memory block of data is logically formed of multiple sub-blocks 290 (in this example, four sub-blocks of 32 bytes each) that may correspond in size, for example, to the smallest allowable access to system memories 108a-108d. In at least some embodiments, sub-blocks 290 may be individually accessed and cached in cache array 284.

Array and directory 282 also includes a cache directory 292 of the contents of cache array 284. As in conventional set associative caches, memory locations in system memories 108 are mapped to particular congruence classes within cache arrays 284 utilizing predetermined index bits within the system memory (real) addresses. The particular cache lines stored within cache array 284 are recorded in cache directory 292, which contains one directory entry for each cache line in cache array 284. As understood by those skilled in the art, each directory entry in cache directory 292 comprises at least a tag field 294, which specifies the particular cache line stored in cache array 284 utilizing a tag portion of the corresponding real address, a LRU (Least Recently Used) field 298 indicating a replacement order for the cache line with respect to other cache lines in the same congruence class, and a state field 296, which indicates the coherence state (also referred to as cache state) of the cache line. Each cache line may also comprise a validity vector 297. Validity vector 297 contains a portion for identifying a subsection of data that has been prefetched. Accordingly, the validity vector 297 may be set in an entry in the cache directory for the target memory block within the cache array to indicate the presence of a fetched subsection of the cache block being accessed by a PFM 234a-n.

To support the transfer of castout cache lines, array and directory 282 includes at least one and preferably multiple castout (CO) buffers 295a-295n, which are each preferably identified with a unique respective CO buffer ID. While a CO buffer 295 is allocated to master 284 for a castout operation, the CO buffer 295 has a "busy" state, and when the CO buffer is released or deallocated by master 284, then the CO 295 buffer has a "done" state.

In a preferred embodiment, a DCBT instruction is received by the processor core. The DCBT instruction includes an OPCODE field, a TH field, and an RA/RB field. The opcode field identifies an operation to be initiated. The TH field specifies whether the DCBT identifies the type of touch (normal or enhanced) of the DCBT instruction. The RA/RB field form the effective address of the instruction. In the main embodiment, the TH field includes a code point that instructs the processing unit to perform one or more functions related to data prefetching. For example, a code value of 10000 in the TH field provides an access hint indicating that a program may soon access an entire cache block addressed by the DCBT instruction. Upon detecting a code value of 10000, the address data may be prefetched into L2 Cache 230 or L3 Cache 232.

Similarly, a code value of 11000 in the TH field provides an access hint indicating that a program may soon access only a portion of a cache block addressed by the DCBT instruction. In this embodiment, a first subfield of the RA/RB field is used to provide the effective address while a 2-bit second subfield is used to specify the size of the portion data to prefetch. A binary value of 00 indicates 8 bytes should be prefetched, 01 indicates 16 bytes, 10 indicates 32 bytes, and 11 indicates 64 bytes. Upon detecting a code value of 11000, the address data may be prefetched into L2 Cache 230 or L3 Cache 232. The size of the data prefetched is dependent on the value stored in the second subfield. The cache coherence is maintained on prefetched cache block boundary. Accordingly, the entire cache block is reserved in the processor cache, but the specified portion of the cache block that was not prefetched is marked as invalid. In this manner a demand load or store operation to the unprefetched portion will be processed as though the cache block were not present. The state of the block in the cache is marked as exclusive.

Still in an alternate embodiment, prefetched data may be fully stored in the L2 cache and partially stored in the L3 cache. In this embodiment prefetched data may be stored where cache resources are most readily available.

Figure 3:
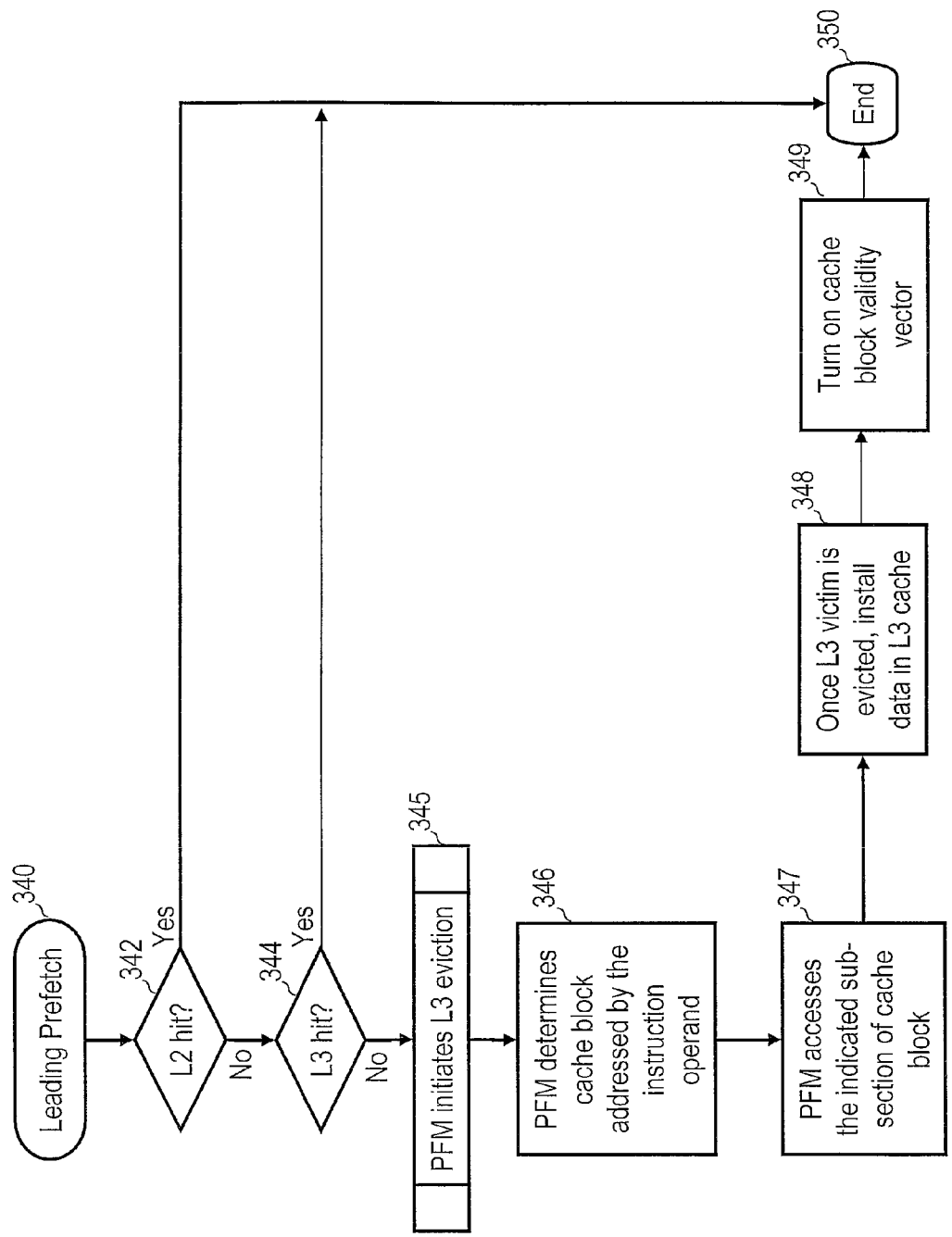
FIG. 3 is a high level logical flowchart of an exemplary method of performing a leading prefetch in response to receiving a DCBT prefetch request instruction, in accordance with one embodiment of the present invention.

Referring now to FIG. 3, there is depicted a high level logical flowchart of an exemplary method of performing a leading prefetch in response to receiving a DCBT prefetch request instruction, in accordance with one embodiment. The illustrated process begins at block 340 following a miss of leading prefetch request in the L1 cache 204 at which point the processing unit determines that the received DCBT prefetch request contains a specific code value of 11000. A code value of 11000 indicates in the TH field of the DCBT instruction indicates that a program may soon access the cache block addressed by the DCBT instruction. Block 342 depicts a determination by L2 cache 230 whether or not the leading prefetch request hits in cache directory 292 of L2 cache 230. If so, the leading prefetch request is aborted, and the process terminates at block 350. If, however, the leading prefetch request misses in L2 cache 230, the process proceeds to block 344.

Block 344 depicts a determination by L3 cache 232 whether or not the leading prefetch request hits in cache directory 292 of L3 cache 232. If so, the leading prefetch request is aborted, and the process terminates at block 350. If, however, the leading prefetch request misses in L3 cache 232, the process proceeds to block 345. Block 345 illustrates L3 cache 232 allocating a prefetch machine 234 to manage the leading prefetch request, which in turn initiates the process of evicting a victim entry from L3 cache 232 in preparation for receiving the prefetch data requested by the leading prefetch request. The victim entry of the L3 cache is the LRU entry.

Next, at block 346, the prefetch machine 234 allocated to the leading prefetch request determines the cache block and the subsection thereof addressed by the DCBT instruction. Prefetch machine 234 then prefetches only the indicated subsection of the addressed data into the cache (block 347). In addition, once eviction of the L3 victim entry is complete and prefetch data is received, prefetch machine 234 updates cache array 284 of L3 cache 232 with the target memory block (block 348). At block 349, the validity vector of the cache block is set; the cache directory entry for the target memory block within the cache array is then updated with an indication of the fetched subsection. Thereafter, the process ends at block 350.

In the flow charts above, one or more of the methods are embodied such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. network attached storages, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent. Additionally, the present invention may be implemented in a machine in the form of a computer-readable storage medium having a plurality of instructions embodied executing on a processing device.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of data processing in a processing unit, including a processor core, an upper level cache memory, a lower level cache memory, and a memory storage, the method comprising:
   in response to the processor core executing a data cache block touch (DCBT) instruction, identifying a cache block that may be accessed; and
   in response to the DCBT instruction:
      determining an effective address in memory storage that contains the cache block from a first subfield of the DCBT instruction,
      determining a specific portion of data in the cache block to be prefetched from a second subfield of the DCBT instruction,
      prefetching only the specific portion of the cache block at the effective address to an entry in the lower level cache memory, and
      denoting a remainder portion of the cache block that was not prefetched as invalid.

2. The method of claim 1, wherein the DCBT instruction includes a cache block hint indicating that a program may soon access the cache block addressed in the DCBT instruction.

3. The method of claim 1, wherein the effective address is derived from a subfield of the DCBT instruction.

4. The method of claim 1, wherein the entry is a least recently used entry among the plurality of entries in lower level cache memory.

5. The method of claim 1, wherein the coherence of the cache block is maintained in lower level cache memory.

6. The method of claim 1, wherein the prefetched cache block is fully stored in an L2 cache portion of the lower level cache memory.

7. The method of claim 1, wherein the prefetched cache block is partially stored in an L2 cache portion of the lower level cache memory.

8. A data processing system, comprising:
   a local processor core;
   a cache memory coupled to the local processor core; and
   processing logic executing on the processor core for enabling the data processing system to perform the steps of:
      in response to the processor core executing a data cache block touch (DCBT) instruction, identifying a cache block that may be accessed; and
      in response to the DCBT instruction:
         determining an effective address in memory storage that contains the cache block from a first subfield of the DCBT instruction,
         determining a specific portion of data in the cache block to be prefetched from a second subfield of the DCBT instruction,
         prefetching only the specific portion of the cache block at the effective address to an entry in the lower level cache memory, and
         denoting a remainder portion of the cache block that was not prefetched as invalid.

9. The data processing system of claim 8, wherein the DCBT instruction includes a cache block hint indicating that a program may soon access the cache block addressed in the DCBT instruction.

10. The data processing system of claim 8, wherein the effective address is derived from a subfield of the DCBT instruction.

11. The data processing system of claim 8, wherein the entry is a least recently used entry among the plurality of entries in lower level cache memory.

12. The data processing system of claim 8, wherein the coherence of the cache block is maintained in lower level cache memory.

13. The data processing system of claim 8, wherein the prefetched cache block is fully stored in an L2 cache portion of the lower level cache memory.

14. The data processing system of claim 8, wherein the prefetched cache block is partially stored in an L2 cache portion of the lower level cache memory.

15. A data processing system computer-readable storage medium having a plurality of instructions embodied therein, wherein the plurality of instructions, when executed by a processing device, allows a machine to:
   in response to the processor core executing a data cache block touch (DCBT) instruction including a cache block hint indicating that a program may soon access the cache block addressed in the DCBT instruction, identifying a cache block that may be accessed; and
   in response to the DCBT instruction:

determining an effective address in memory storage that contains the cache block from a first subfield of the DCBT instruction, determining a specific portion of data in the cache block to be prefetched from a second subfield of the DCBT instruction, prefetching only the specific portion of the cache block at the effective address to an entry in the lower level cache memory, and denoting a remainder portion of the cache block that was not prefetched as invalid.

16. The computer-readable storage medium of claim 15, wherein the effective address is derived from a subfield of the DCBT instruction.

17. The computer-readable storage medium of claim 15, wherein the entry is a least recently used entry among the plurality of entries in lower level cache memory.

18. The computer-readable storage medium of claim 15, wherein the coherence of the cache block is maintained in lower level cache memory.

19. The computer-readable storage medium of claim 15, wherein the prefetched cache block is fully stored in an L2 cache portion of the lower level cache memory.

20. The computer-readable storage medium of claim 15, wherein the prefetched cache block is partially stored in an L2 cache portion of the lower level cache memory.

* * * * *